United States Patent [19]
Cowgur

[11] Patent Number: 5,310,113
[45] Date of Patent: May 10, 1994

[54] SPRAYER CONTROL SYSTEM AND METHOD FOR USING SAME

[76] Inventor: Bruce E. Cowgur, 14 Katie La., Rochester, Ill. 62563

[21] Appl. No.: 983,816

[22] Filed: Dec. 1, 1992

[51] Int. Cl.⁵ .................. B05B 12/00; B05B 9/06
[52] U.S. Cl. ........................... 239/10; 239/68; 239/69; 239/71; 239/127; 239/155; 239/172; 239/307; 239/308
[58] Field of Search ............... 239/10, 71, 124, 127, 239/155, 170, 172, 307, 308, 310, 446, 447, 68, 69

[56] References Cited

U.S. PATENT DOCUMENTS

| | | | |
|---|---|---|---|
| 153,060 | 7/1874 | Fairchild | 239/447 |
| 592,447 | 10/1897 | Richardson | 239/446 |
| 1,912,759 | 6/1933 | Clark | 239/308 X |
| 3,806,037 | 4/1974 | Loewenkamp | 239/124 X |
| 4,121,767 | 10/1978 | Jensen | 239/71 |
| 4,637,547 | 1/1987 | Hiniker et al. | 239/69 X |
| 4,645,009 | 2/1987 | Hawelka et al. | 239/310 X |
| 4,714,196 | 12/1987 | McEachern et al. | 239/127 X |
| 4,723,710 | 2/1988 | Lucore, II | 239/124 |

FOREIGN PATENT DOCUMENTS

| | | | |
|---|---|---|---|
| 2508823 | 1/1983 | France | 239/68 |
| 774171 | 5/1957 | United Kingdom | 239/127 |

Primary Examiner—Andres Kashnikow
Assistant Examiner—William Grant
Attorney, Agent, or Firm—Zarley, McKee, Thomte, Voorhees & Sease

[57] ABSTRACT

A sprayer control system and method for using same includes a pump for directing a mixture of chemical and fluid carrier to a flow control valve. The flow control valve includes an intake port, a bypass port, and a regulated outlet port. A valve member is rotatable to direct fluid from the intake port either to the bypass port or the regulated output port. Fluid from the bypass port is sent through a bypass line back to the intake opening of the fluid pump. Various chemical tanks are connected to the bypass line for injecting metered amounts of chemical into the bypass line.

11 Claims, 4 Drawing Sheets

SPRAYER CONTROL SYSTEM AND METHOD FOR USING SAME

BACKGROUND OF THE INVENTION

This invention relates to a sprayer control system and method for using same.

Chemical spraying systems are widely used in the field of agriculture. These sprayers are used to spray agricultural crops with insecticides, herbicides, fertilizers, and other chemicals. Environmental concerns make it desirable to be able to precisely control the amount of chemicals being sprayed so that excess use of chemicals is avoided. Precise control of the quantity and mixture of chemicals is also desirable in order to minimize chemical costs and thereby maximize profit.

Chemicals are usually applied to agricultural crops by vehicles which move through the crops and which carry sprayers for spraying the chemicals on the crops. It is desirable to be able to adjust and control the flow of chemical being sprayed in relationship to the velocity of the vehicle. That is, as the velocity increases, the flow rate of the chemical needs also to increase correspondingly.

The control system for the sprayer also should provide the operator with means for easily adjusting the chemical rate being applied, the number of spray booms being actuated, and the width of the spray pattern.

Prior art spray systems utilize two or more valves in the system for controlling the flow rate of the chemical to the sprayer heads. One problem encountered with these systems is the difficulty in adjusting the flow rate without creating a back pressure on the pump which is pumping the fluid to the spray heads. Prior art valving systems for sprayers often create this back pressure on the pump which results in damage or unnecessary wear on the pump.

Therefore, a primary object of the present invention is the provision of an improved sprayer control system and method for using same.

A further object of the present invention is the provision of an improved sprayer control system and method for using same which utilizes a single flow control valve which permits the adjustment of the flow without creating a back pressure on the fluid pump.

A further object of the present invention is the provision of an improved sprayer control system and method for using same which permits the precise control of the fluid flow to the spray heads, as well as a precise control of the ratio of chemical mixture to the carrier fluid.

A further object of the present invention is the provision of an improved control system and method for using same which is easily adjusted to accommodate the desired flow rate and application rate desired for the particular situation.

A further object of the present invention is the provision of an improved sprayer control system and method for using same which is economical to manufacture, durable in use, and efficient in operation.

SUMMARY OF THE INVENTION

The foregoing objects are achieved by a chemical mixing and delivery system which includes a fluid pump having a fluid intake opening and a discharge opening, and which is adapted to pump fluid from the intake opening outwardly through the discharge opening. The intake opening of the fluid pump is connected to a fluid carrier such as water. The fluid intake of the pump is also connected to a metered source of chemical which introduces the chemical to the fluid carrier prior to the time that it enters the pump. Numerous sources of chemicals may be connected to the intake end of the pump for providing different chemicals to the mixture.

The discharge end of the pump is connected to a fluid control valve which has an intake port, a regulated outlet port, and a bypass port. The fluid received from the pump enters the intake port of the flow control valve, and depending upon the position of the valve is directed either to the regulated outlet port, the bypass port, or both the regulated port and the bypass port. The bypass port of the flow control valve is connected to a bypass line which directs the fluid back to the intake opening of the pump. The bypass line includes T-connections for permitting the introduction of chemicals into the fluid being directed to the intake opening of the port. In this manner, the chemicals are introduced to the intake port of the pump through the bypass line.

The regulated outlet port of the flow control valve is connected to the spray booms of the sprayer and delivers the mixture of chemical and carrier to the spray booms.

The structure of the flow control valve is important to the present invention. The flow control valve includes a valve member having two ports therein which are connected at right angles to one another. The two ports can be moved to a bypass position which directs all of the fluid from the intake port of the valve to the bypass port of the valve. The ball valve member can then be rotated to a regulated output position wherein all of the fluid entering the intake port of the flow control valve is directed to the regulated output port of the flow control valve.

One important feature of the flow control valve of the present invention occurs when the ball valve member is moving from its bypass position to its regulated position. During this movement, the ball valve member permits the fluid from the intake port of the flow control valve to pass outwardly to both of the bypass port and the regulated outlet port. The amount of fluid directed to the regulated output port increases progressively as the valve member moves to its regulated position, and ultimately increases to the point where all of the fluid is being directed to the regulated outlet port. The same thing happens in reverse when the ball valve member is moved from its regulated position to its bypass position. That is, the amount of fluid being directed to the regulated outlet port is progressively decreased until it is completely closed off when the valve member is in its bypass position.

Thus, the flow control valve of the present invention does not shut off the flow of fluid as it is moving between its bypass and regulated positions. Instead, the volume of flow through the intake port of the flow control valve is directed proportionally either to the regulated outlet port or to the bypass port or to both. In prior art systems, the valving often resulted in a complete shut-off of fluid flow at least momentarily during the opening and closing of the various valves. This creates a back pressure on the fluid pump either causing damage or wear to the pump. In the present invention, the back pressure to the pump is constant, and the flow is never completely shut off.

Several chemical containers contain the various chemicals which are being mixed in the mixture. These containers are connected to variable pumps which pump the chemical from the container to a T-connection in the bypass line. Thus, the various chemicals are introduced to the bypass line where they are ultimately introduced into the intake opening of the pump.

A console is adapted to be mounted in the vehicle carrying the spray control system, and this console is connected to the flow control valve and to the various chemical pumps which pump chemical into the system. The console is also connected to various sensors for sensing the ground speed of the vehicle, for sensing whether or not the particular spray booms are on or off, and for sensing the rate of flow of fluid to the booms. Furthermore, the console includes various switches for selecting the chemical application rate or for making other various adjustments in the spraying. Within the console are a master microprocessor and slave microprocessor. The master microprocessor receives information from the ground speed sensor, the boom sensors, the flow meter, and the various manual settings. The master microprocessor then utilizes this information to adjust the flow control valve, to display information on a digital display on the front of the monitor, to create alarms when the system is not functioning properly or when the chemical is depleted from one of the chemical tanks, and for displaying various LEDs on the front of the monitor. The master microprocessor also communicates with the slave microprocessor which processes this information and controls the speeds of the various motors which drive the pumps for adding chemical to the system.

The present system permits the adjustment of the fluid flow to the sprayer booms and also permits the adjustment of the pumps which introduce chemical into the system. This permits the ratios of chemicals and carrier fluid to be adjusted as desired, and also permits the flow rate to the booms to be adjusted relative to the ground speed of the vehicle.

DETAILED DESCRIPTION OF THE PREFERRED EMBODIMENT

Figure 1:
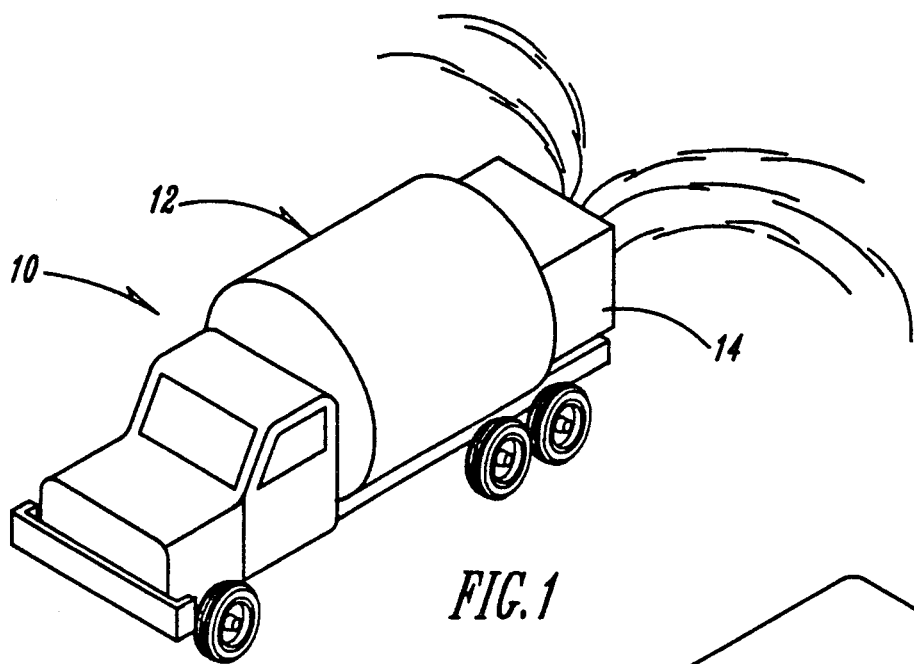
FIG. 1 is a perspective view of a typical vehicle for spraying agricultural fields.
Figure 6:
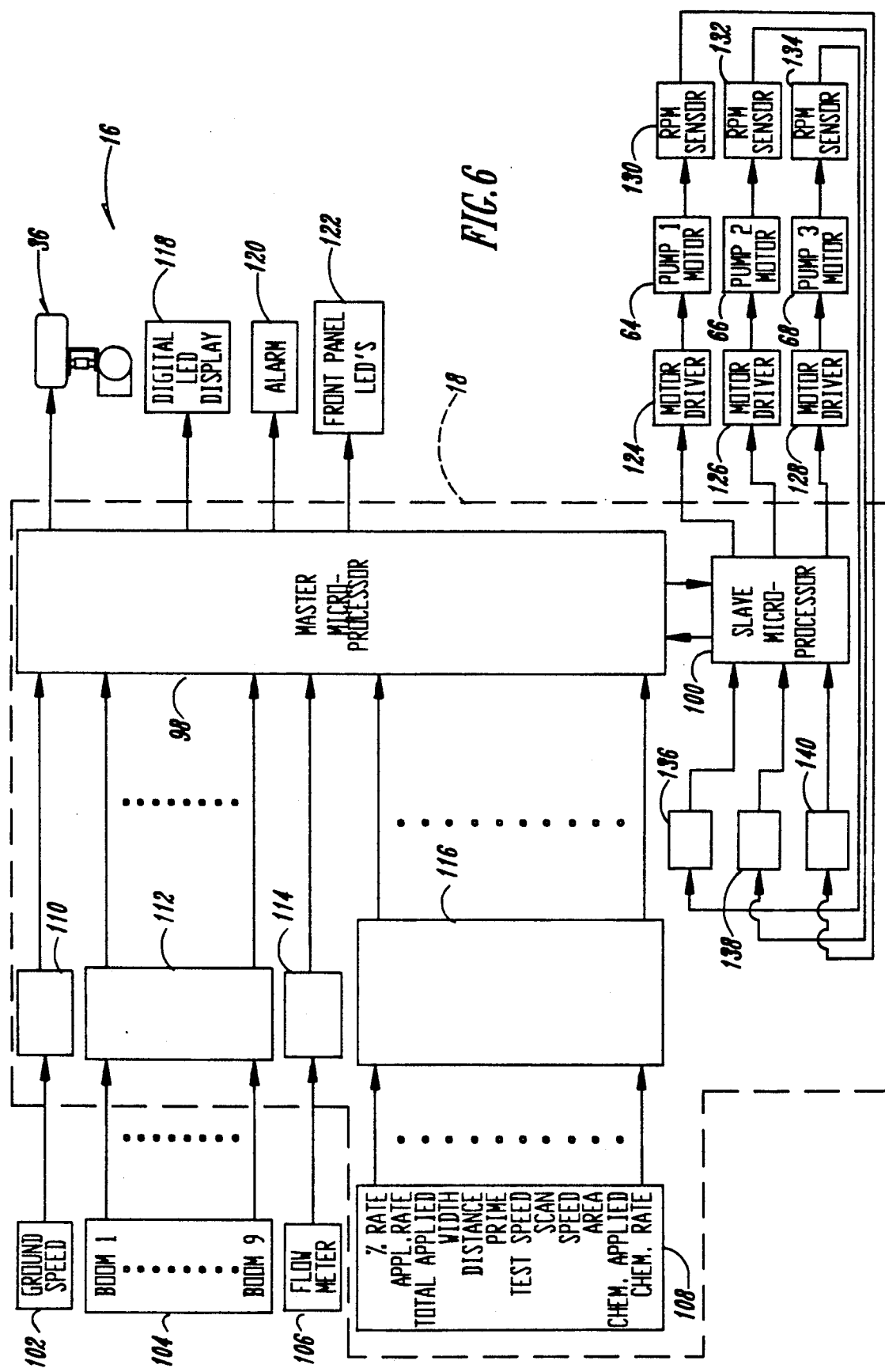
FIG. 6 is a block diagram of the flow control system of the present invention.

Referring to the drawings, the numeral 10 generally designates a typical vehicle for spraying chemical on an agricultural crop. Vehicle 10 includes a fluid carrier tank 12 and a plurality of spray booms 14 which are adapted to spray the mixture of chemical and carrier onto the agricultural crop. The particular spray booms 14 shown in FIG. 1 are typical of a compact sprayer system which utilizes spray nozzles directed to different areas behind the vehicle for creating a spray pattern as desired. Other types of sprayers may include an elongated boom having spray heads located at various spaced intervals thereon. The spray system of the present invention is generally designated by the numeral 16 (FIG. 6).

Figure 2:
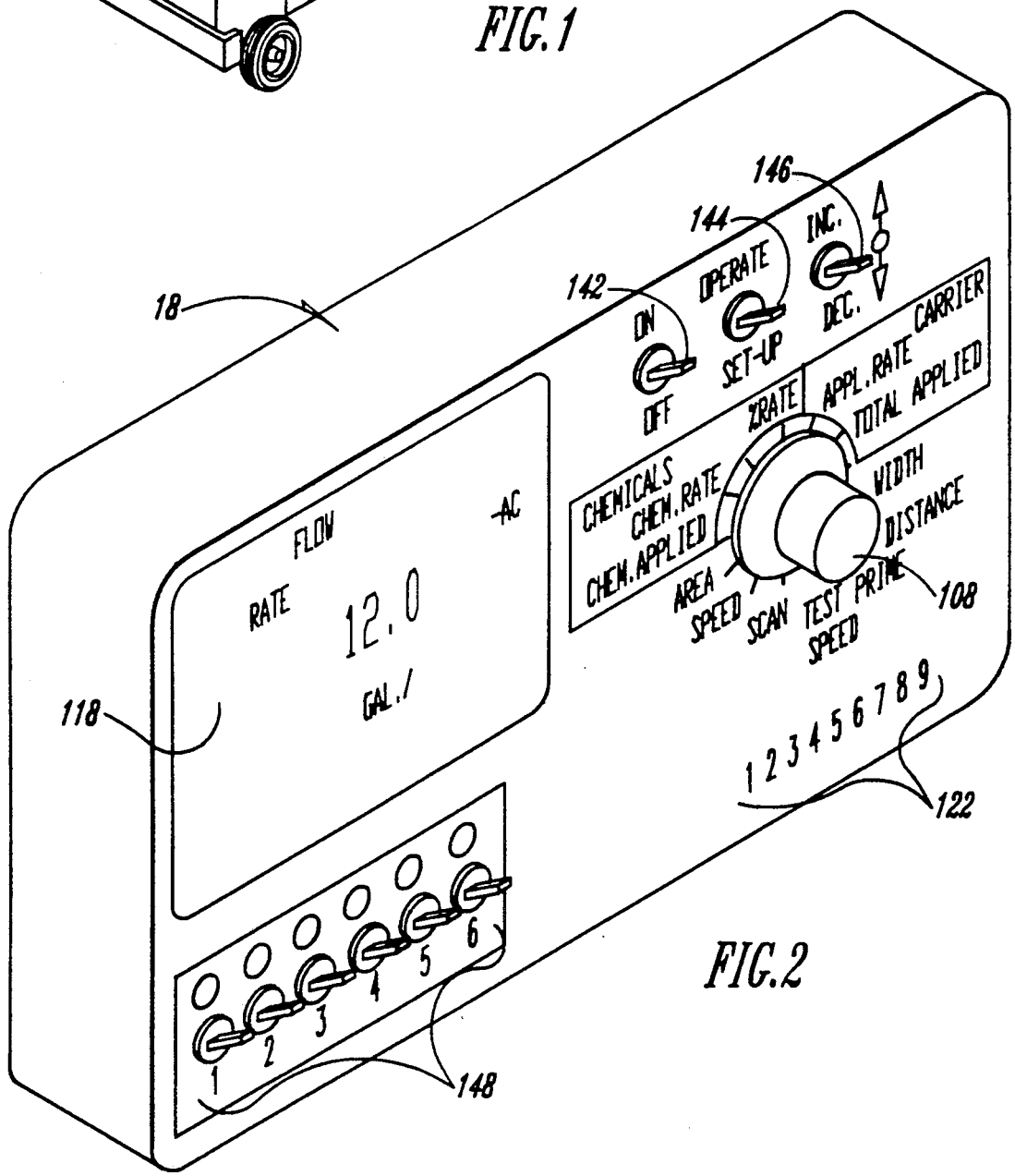
FIG. 2 is a perspective view of the control console for the present invention.
Figure 3:
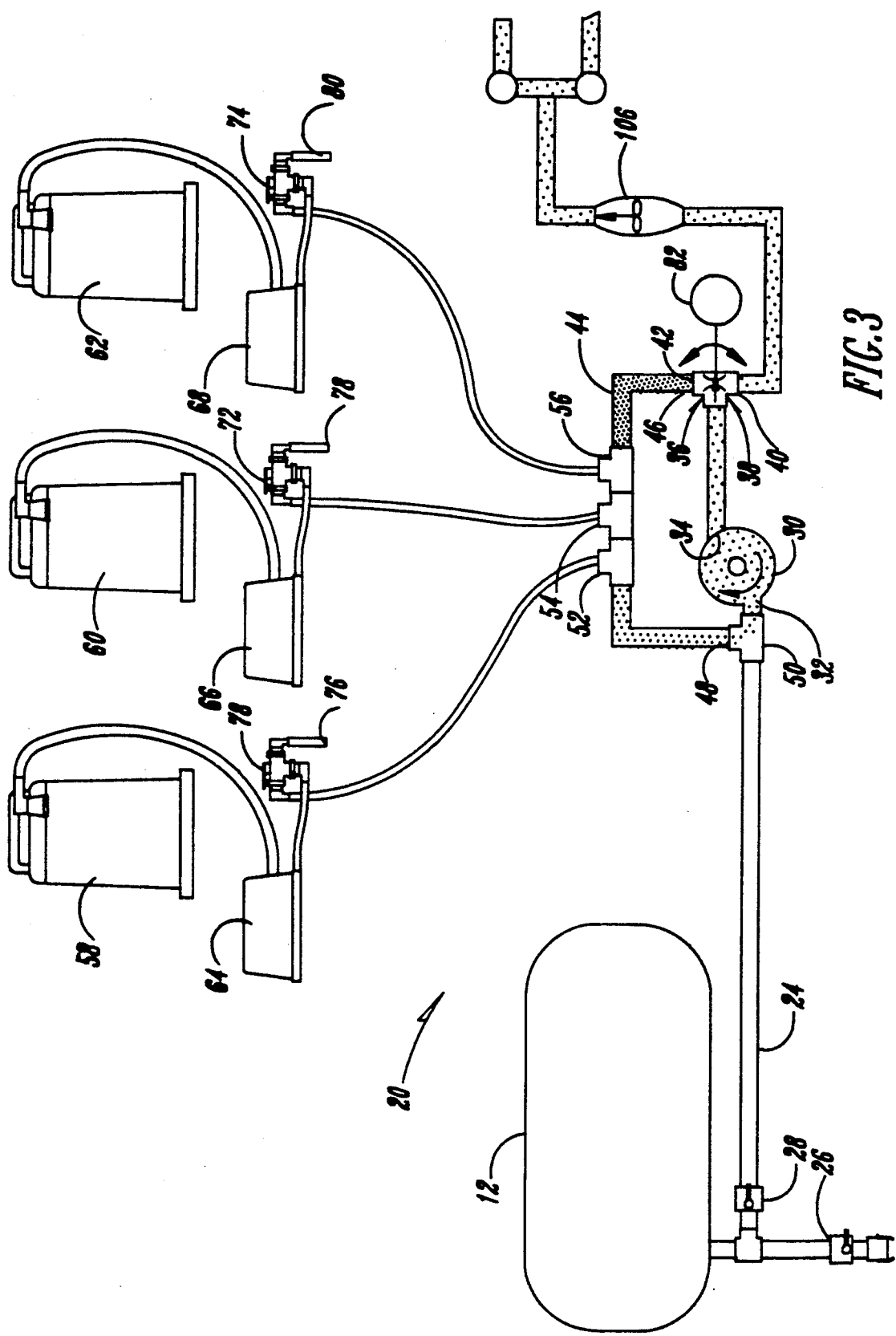
FIG. 3 is a schematic view of the spray control circuitry for the present invention.

Control system 16 includes a console 18 shown in FIG. 2 connected to a spray circuit 20 shown in FIG. 3. Spray circuit 20 includes a carrier supply line 24 which is adapted to receive a fluid carrier from the fluid carrier tank 12. The carrier may be water, or it could be some other solvent used as a base carrier for mixing with the chemical desired to be sprayed. Tank 12 is provided with a drain valve 26 for permitting the draining of the contents of tank 12 and also with a manual carrier supply valve 28 which may be opened or closed for controlling the flow of carrier fluid into the system. Carrier supply line 24 is connected to an intake opening 32 of a pump 30. Pump 30 also includes a discharge opening 34 which is connected to an intake port 38 of a flow control valve 36.

Flow control valve 36 includes a regulated outlet port 40 and a bypass port 42. A bypass line 44 includes a first end 46 connected to bypass port 42 and a second end 48 connected to the intake opening 32 of pump 30 by means of a T-connection 50.

Bypass line 44 includes three chemical T-connections 52, 54, 56 which are connected to three chemical tanks 58, 60, 62. Between the chemical tanks 58, 60, 62 and the T-connections 52, 54, 56 are chemical pumps 64, 66, 68, each of which is connected to a manual valve 70, 72, 74, respectively. Manual valves 70, 72, 74 each includes calibration tubes 76, 78, 80, respectively. The valves 70, 72, 74 may be moved to a closed position to an open position and to a calibration position. Calibration of the pumps 64, 66, 68 can be achieved by measuring the amount of fluid exiting from the calibration tubes 76, 78, 80 over a given period of time. This calibration process will enable the operator to be assured that the pumps 64, 66, 68 are properly calibrated to deliver the amount of chemical desired. The chemical from each of the tanks 58, 60, 62 is delivered to the T-connections 52, 54, 56 and mixed with the fluid going through bypass line 44. Thus, these chemicals are mixed with the carrier 24 at the T-connection 50 immediately prior to entering the intake opening 32 of pump 30.

Figure 4:
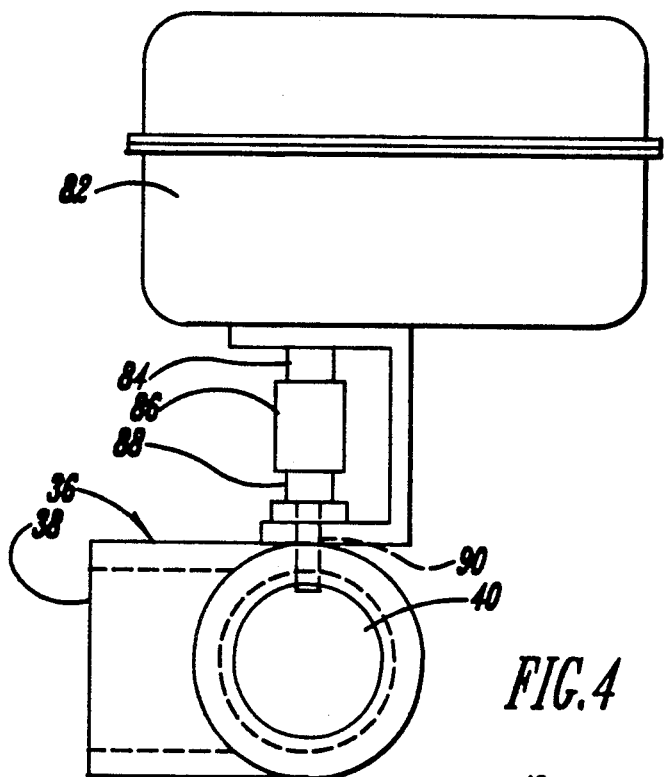
FIG. 4 is a side elevational view of the flow control valve of the present invention.

Flow control valve 36 includes a flow control valve motor 82 (FIG. 4) which drives an output motor shaft 84 connected by a coupling 86 to a driven shaft 88. Extending from driven shaft 88 is a drive pin 90 which is keyed into a ball valve 92 which is spherical in shape and which is adapted to rotate about a vertical axis provided by dry pin 90. Ball valve 92 includes a first port 94 and a second port 96 which are interconnected to a right angle connection within the ball valve 92.

Figure 5:
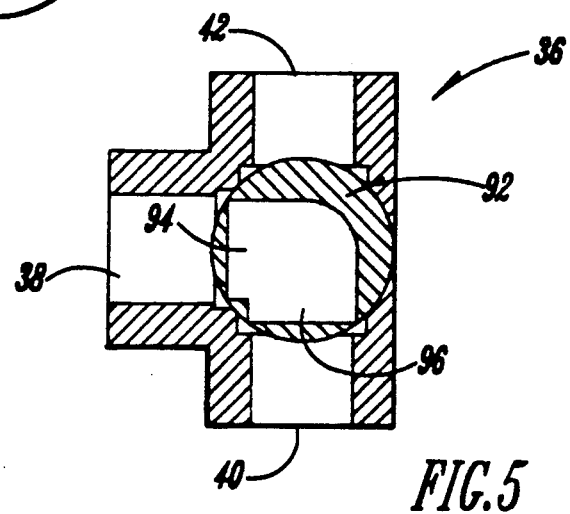
FIGS. 5, 5A, and 5B are sectional views taken along line 5—5 of FIG. 4, and showing the ball valve in various positions.
Figure 5A:
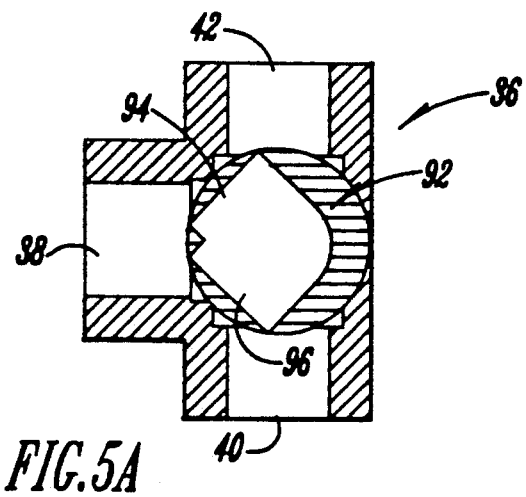
Figure 5B:
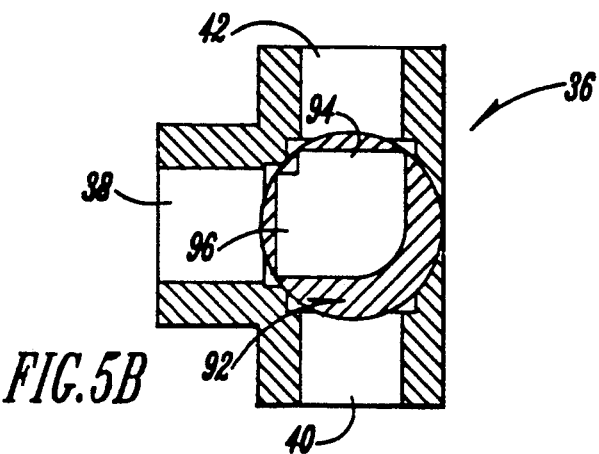

FIGS. 5, 5A, and 5B illustrate the various positions of the ball valve 92. In FIG. 5, the ball valve is in its regulated flow position wherein all of the fluid entering intake port 38 is directed to regulated outlet port 40, and no fluid is directed to the bypass port 42. FIG. 5B illustrates the position of the ball valve 92 when it is in its bypass position. In this position, all of the fluid from intake port 38 is directed to the bypass port 42, and none of the fluid is directed to the regulated outlet port 40.

FIG. 5A illustrates the position of the ball valve 92 as it is moving between its bypass position and its regulated position of FIGS. 5 and 5B respectively.

In the intermediate position shown in FIG. 5A, the ball valve permits fluid to flow from intake port 38 through both of the bypass port 42 and the regulated port 40. The apportionment of fluid to the bypass port 42 and the regulated port 40 varies progressively as the ball valve moves from the regulated position of FIG. 5 to the bypass position of FIG. 5B. During the initial movement of the ball valve 92, a small amount of fluid is directed to the bypass port 42, and a far greater proportion is directed to the regulated port 40. In the position shown in FIG. 5A where the ball valve is approximately half way between the bypass and regulated positions, the flow is approximately equal to the bypass port 42 and the regulated port 40. As the ball valve continues to turn in a clockwise direction, it approaches the bypass position in FIG. 5B, reducing progressively the amount of fluid directed to the regulated port 40 until that amount is zero.

The preferred embodiment of the flow control valve 36 is manufactured by K-Z Co., Inc., Route 2, Box 196B, Ashland, Nebraska 68003 and is designated under the Series EH2 Valves, Model 79. While this particular valve has been utilized in other applications, it has not been used in a sprayer control system in the manner shown in the present application. One advantage of using this particular valve in a sprayer control system is the fact that the flow can be apportioned between the bypass port and the regulated port 40 with infinite adjustment.

Referring to FIG. 6, console 18 includes a master microprocessor 98 and a slave microprocessor 100. Microprocessors 98, 100 are identical, and are manufactured by Intell Corporation under the Model No. 80C51FA-1. These microprocessors are programmed to provide the various control functions described in this application. The master microprocessor 98 is connected to a number of input devices which include a ground speed sensor 102 adapted to sense the ground speed of the vehicle and to deliver a ground speed signal to a signal conditioning circuit 110 which in turn delivers the conditioned signal to the microprocessor 98. A plurality of boom sensors 104 are connected to each of the various booms, to sense whether or not the booms are operable or inoperable. These boom sensors deliver separate signals to a conditioning circuit 112 which in turn delivers the signals to the master microprocessor 98, thereby telling the microprocessor 98 whether or not each of the various spray booms are operable. In some situations, perhaps only one boom will be utilized, and in other situations as many as nine or more different booms may be operated.

A flow meter sensor 106 is connected in the line leading from regulated outlet port 40 of flow control valve 36. The flow meter 106 senses the rate of flow of fluid through the line to the booms and delivers this information by means of a signal to a conditioning circuit 114 which in turn delivers the processed signal to the master microprocessor 98.

Console or monitor 18 also includes a manually controllable switch 108 which can be rotated to a plurality of positions to program the master microprocessor 98. The functions of each of these positions of switch 108 are described below:

Percentage Rate: When the switch is in this position, the monitor registers the percentage of chemical which is introduced to the carrier. By manipulating an increase or decrease switch 146, the operator can set the desired percentage of chemical which will be introduced into the ultimate mixture delivered to the spray booms. During the time of setting this percentage rate, the switch 144 is moved downwardly to its "set-up position". After the correct percentage has been programmed into the microprocessor 98, the switch 144 is flipped upwardly to its operate position, and the microprocessor will cause the programmed percentage of chemical to be introduced into bypass line 44. In order to accomplish this adjustment, the microprocessor 98 sends the appropriate signal to the slave microprocessor 100 which in turn sends the appropriate signals to motor drivers 124, 126, 128 which drive pumps 64, 66, 68 respectively. A feedback system comprising RPM sensors 130, 132, 134 provides a signal back through signal processors 136, 138, 140 to the slave microprocessor, telling the slave microprocessor whether or not the desired RPMs are in fact achieved with the three pumps. These pumps may be parastolic, piston, diaphragm or other metering pumps, and they introduce individual pulses or squirts of chemical into the system depending upon the speed at which they are rotating. The feedback system measures these pulses or squirts thereby telling the slave microprocessor whether or not the desired volume of chemical is being introduced to bypass line 44.

Application Rate: Turning the switch to the application rate position causes the digital display 118 to display the rate of fluid passing through flow meter 106. When the switch 144 is in the set-up position, the operator can increase or decrease the programmed flow rate, and when the switch 144 is in the operate position, the digital display 118 will display the actual flow rate being measured by flow meter 106.

Total Applied: Turning the switch to the total applied position causes the digital display 118 to register the total volume of mixture of carrier and chemical which has been delivered to the booms during the spraying operation.

Width: Turning the switch to the width position causes the digital display 118 to display the spray width of the combined booms. When switch 144 is in the set-up position, the operator can adjust the boom width, and when it is in the operate position, the display shows the actual boom width being sprayed by the various booms.

Distance: When the switch is turned to the distance position, the digital display shows the distance which the sprayer has traveled during the spraying operation.

Prime: When the switch is moved to the prime position, the operator can program the master microprocessor to deliver a predetermined volume of chemical to the circuitry so that the chemical extends to the point of injection. This prevents a delay when the spraying operation begins which would normally be the case if the spray circuitry were not primed with spray chemical. The prime mode can be programmed for each of the individual pumps separately so as to set up the program with a fixed volume of priming fluid for each pump. The pump 30 will then prime the system to the point of injection.

Test Speed: The test speed position enables programming of the internally generated velocity signal. In the operate mode the console uses the programmed value instead of the actual vehicle speed. The internally generated test speed is displayed on the digital display.

Scan: When the switch is moved to the scan position, the program automatically rotates to each of the various functions of switch 108 and displays the appropriate data on the display screen 118.

Speed: When the switch is in this position, the digital display 118 displays the ground speed of the vehicle.

Area: When the switch is rotated to the area position, the digital display 118 shows the cumulative area total which has been sprayed during the operation in acres.

Chemical Applied: In the chemical applied position, the digital display 118 displays the total volume of chemical which has been applied since the spraying operation began.

Chemical Rate: When the switch is in the chemical rate position, it displays the quantity of chemical which is being applied per acre. When switch 144 is in the set-up position, the microprocessor 98 can be programmed for the desired chemical application rate. When the switch is moved to its operate position, the microprocessor causes this chemical rate to be applied.

All of the information from switch 108 is delivered as a signal to a signal processor 116 which in turn delivers the appropriate process signal to the master microprocessor 98.

The master microprocessor 98 receives the signals from the various inputs and processes them. It then causes the digital display 118 to display the appropriate information; causes the flow control valve 36 to be moved to the desired position; causes the alarm to be actuated if any condition such as a chemical or carrier misapplication is sensed; and causes the appropriate front panel LEDs to be lighted. The master microprocessor 98 also sends signals to the slave microprocessor 100 for causing the various chemical pumps 64, 66, 68 to be driven at the desired rates to achieve the desired percentage of chemical.

Additional switches on monitor 18 include a master on/off switch 142 for turning the monitor on and off and a plurality of pump on/off switches 148 for signaling to the monitor that each of the individual pumps are on. The drawing in FIG. 2 shows a total of six possible pumps, but this console can be operated with no pump switches, three pump switches, or six pump switches. For each group of three pumps an additional slave microprocessor 100 is added. Similarly, a plurality of front panel LEDs 122 are lit to indicate which of the various booms are in an on condition.

The preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

I claim:

1. A chemical mixing and delivery system for delivering a mixture of carrier fluid and fluid chemical additive to at least one sprayer head, said system comprising:

a regulated flow conduit connected to said sprayer head;

a fluid pump having a fluid intake opening and a discharge opening and being adapted to pump fluid from said intake opening outwardly through said discharge opening;

a flow control valve having an intake port, a bypass port, and a regulated port;

first conduit means connecting said intake opening of said pump to said source of said carrier fluid;

second conduit means connecting said discharge port of said pump to said intake port of said flow control valve;

said regulated port of said flow control valve being adapted for connection to said regulated flow conduit;

a bypass conduit having a first end connected to said bypass port of said flow control valve and a second end connected to said first conduit means;

chemical additive means for adding a predetermined quantity of said chemical additive to said bypass conduit whereby a mixture of said chemical additive and said carrier fluid will be introduced to said fluid intake opening of said pump;

said flow control valve having a valve member movable between a bypass position connecting said bypass port to said intake port and a regulated position connecting said intake port to said regulated port, said valve member connecting said intake port to both of said bypass port and said regulated port while moving between said bypass position and said regulated position;

a flow sensor connected to said regulated flow conduit between said flow control valve and said sprayer head for sensing the rate of flow of said mixture of said chemical additive and said carrier fluid through said regulated flow conduit;

control means connected to said flow sensor and said flow control valve for causing adjustment of the position of said flow control valve in response to the rate of flow sensed by said flow sensor;

said control means comprising a microprocessor programmed to compare said flow rate sensed by said flow sensor to a predetermined programmed flow rate and to cause adjustment of said flow control valve until said flow rate sensed by said flow sensor matches said predetermined programmed flow rate.

2. The system according to claim 1 wherein said valve member completely closes off said intake port from said bypass port when said valve member is in said regulated position, and said valve member completely closes off said intake port from said regulated port when said valve member is in said bypass position.

3. The system according to claim 1 wherein said valve member, when moving from said bypass position to said regulated position, progressively increases the volume of fluid flowing from said intake port to said regulated port and progressively decreases the volume of fluid flowing from said intake port to said bypass port, and said valve member, when moving from said regulated position to said bypass position, progressively increases the volume of fluid flowing from said intake port to said bypass port and progressively decreases the volume of fluid flowing from said intake port to said regulated port.

4. The system according to claim 1 wherein said chemical additive means comprises at least one source of said fluid chemical additive, chemical conduit means connecting said at least one chemical source to said bypass conduit for permitting said fluid chemical additive to pass from said at least one chemical source into said bypass conduit, and chemical valve means for adjusting the amount of said chemical additive which passes into said bypass conduit.

5. The system according to claim 4 wherein said control means connected to said chemical valve means and said flow control valve for controlling movement of said chemical valve means and said flow control valve.

6. The system according to claim 5 wherein said control means further comprises power means for supplying power to said chemical valve means and said flow control valve, said microprocessor being connected to said power means and being programmed to cause said power means to move said chemical valve means and said flow control valve to predetermined respective positions for causing a predetermined amount of said chemical additive for a desired mixture to pass into said bypass conduit and a predetermined volume of said mixture to be pumped by said pump to said regulated conduit.

7. The system according to claim 6 and further comprising data input means connected to said microprocessor for providing said microprocessor with input data corresponding to the desired mixture of said fluid chemical additive and said carrier fluid and corresponding to said programmed flow rate of said mixture desired to be delivered to said regulated conduit.

8. The system according to claim 7 wherein said data input means further comprises at least one manually operable data switch for manually entering selected data into said microprocessor.

9. The system according to claim 8 wherein one of said at least one switch is a rate switch for entering rate data into said microprocessor corresponding to and programmed flow rate of said mixture to said regulated flow conduit.

10. The system according to claim 9 wherein said data input means further comprises a ground speed sensor adapted to be connected to a vehicle for sensing the ground speed of said vehicle;

said ground speed sensor being connected to said microprocessor, said microprocessor being programmed to cause adjustment of said flow control valve in response to changes in ground speed sensed by said ground speed sensor.

11. A method for mixing and delivering a carrier fluid and a chemical additive fluid to a regulated flow conduit comprising:

introducing a first predetermined quantity of said chemical additive fluid to a second predetermined quantity of said carrier fluid to create a mixture;

using a pump to pump said mixture to an intake port of a flow control valve, said flow control valve having a regulated outlet port, a bypass port, and a valve member movable between a regulated position wherein said mixture will flow from said intake port to said regulated outlet port and a bypass position wherein said mixture will flow from said intake port to said bypass port, said valve member when moving from said regulated position to said bypass position causing a progressively increasing volume of said mixture to be delivered to said bypass port and a progressively decreasing volume of said mixture to be delivered to said regulated outlet port;

taking the bypass portion of said mixture flowing from said bypass port and reintroducing said bypass portion to said pump for being pumped again to said intake port of said flow control valve;

sensing the flow rate of said mixture flowing from said regulated outlet port with a flow sensor;

connecting a microprocessor to both of said flow sensor and said valve member;

using said microprocessor to compare the flow rate sensed by said flow sensor to a predetermined regulate flow rate and to cause movement of said valve member to a position wherein said flow rate sensed by said flow sensor matches said predetermined flow rate.

* * * * *